United States Patent [19]

Pechanek et al.

[11] Patent Number: 4,961,140

[45] Date of Patent: Oct. 2, 1990

[54] APPARATUS AND METHOD FOR EXTENDING A PARALLEL SYNCHRONOUS DATA AND MESSAGE BUS

[75] Inventors: Gerald G. Pechanek; David J. Shippy, both of Endwell; Mark C. Snedaker, Vestal; Sandra S. Woodward, Endwell, all of N.Y.

[73] Assignee: International Business Machines Corporation, Armonk, N.Y.

[21] Appl. No.: 212,784

[22] Filed: Jun. 29, 1988

[51] Int. Cl.[5] .................. G06F 13/36; G06F 13/42; G06F 13/00

[52] U.S. Cl. .................. 364/200; 364/900; 364/935.41; 364/937.01; 364/931.4; 364/946.7; 364/242.92; 364/243.1; 364/228

[58] Field of Search .................. 364/200, 900

[56] References Cited

U.S. PATENT DOCUMENTS

| | | | |
|---|---|---|---|
| 4,320,467 | 3/1982 | Glass | 364/900 |
| 4,375,639 | 3/1983 | Johnson, Jr. | 364/200 |
| 4,392,207 | 7/1983 | Dockal | 364/900 |
| 4,402,040 | 8/1983 | Evett | 364/200 |
| 4,463,445 | 7/1984 | Grimes | 364/900 |
| 4,514,823 | 4/1985 | Mendelson et al. | 364/900 |
| 4,580,213 | 4/1986 | Hulett et al. | 364/200 |
| 4,602,327 | 7/1986 | La Violette et al. | 364/200 |
| 4,620,278 | 10/1986 | Ellsworth et al. | 364/200 |
| 4,628,446 | 12/1986 | Hoffner | 364/900 |
| 4,649,513 | 3/1987 | Martin et al. | 364/900 |
| 4,719,569 | 1/1988 | Ludemann et al. | 364/200 |
| 4,758,948 | 7/1988 | May et al. | 364/200 |

Primary Examiner—Michael R. Fleming
Assistant Examiner—Gopal C. Ray
Attorney, Agent, or Firm—Hugh D. Jaeger

[57] ABSTRACT

An input/output bus for a data processing system which has extended addressing capabilities and a variable length handshake which accommodates the difference delays associated with various sets of logic and a two part address field which allows a bus unit and channel to be identified. The various units can disconnect from the bus during internal processing to free the bus for other activity. The unit removes the busy signal prior to dropping the data lines to allow a bus arbitration sequence to occur without slowing down the bus.

13 Claims, 16 Drawing Sheets

Dual Usage, Daisy Chained ADCE Bus

FIG. 4

| TITLE | COMMAND FIELD BINARY | HEX |
|---|---|---|
| Test and Set – No Key/ACB Checking | 00010100 | 14 |
| Read Storage – No Key ACB Checking | 00010000 | 10 |
| Read Storage – ACB Checking Only | 00010001 | 11 |
| Read Storage – Key/ACB Checking | 00010011 | 13 |
| Write Stg/PSTS – No Key/ACB Checking | 00111000 | 38 |
| Write Stg/PSTS – ACB Checking Only | 00111001 | 39 |
| Write Stg/PSTS – Key/ACB Checking | 00111011 | 3B |
| Write Storage – No Key/ACB Checking | 00111100 | 3C |
| Write Storage – ACB Checking Only | 00111101 | 3D |
| Write Storage – Key/ACB Checking | 00111111 | 3F |
| Copy IOIC Control Register | 11011100 | DC |
| Copy IOIC Status Word | 11011001 | D9 |
| Copy Message Buffer Register 1 | 11011110 | DE |
| Copy Message Buffer Register 2 | 11011111 | DF |
| Copy Message Origination Status Word | 11011010 | DA |
| Copy Monitor Status Word | 11011011 | DB |
| Load Message Buffer Register 1 | 10011110 | 9E |
| Load Message Buffer Register 2 | 10011111 | 9F |
| Move Message Origination Status Word | 11011000 | D8 |
| Nullify Bus Operation | 10010000 | 90 |
| Set Monitor Status Word | 10011011 | 9B |
| Reset ICCR Under Mask | 10011101 | 9D |
| Reset ICSW Under Mask | 10011001 | 99 |
| Set ICCR Under Mask | 10011100 | 9C |
| Unit Operation Read | 10010100 | 94 |
| Unit Operation Read, Direct | 10010101 | 95 |
| Unit Operation Write 4 bytes | 10010110 | 96 |
| Unit Operation Write, Direct 4 bytes | 10010111 | 97 |
| Unit Operation Write 12 bytes | 10110110 | B6 |
| Unit Operation Write, Direct 12 bytes | 10110111 | B7 |
| Status Read No Errors | 00000001 | 01 |
| Status Write No Errors | 10001001 | 89 |
| Status Read Errors | 10000101 | 85 |
| Status Write Errors | 10001101 | 8D |
| Message Command | 00000011 | 03 |
| PBO Return Data Command | 01000000 | 40 |

Address/Data/command Bus Commands

FIG. 5

| BUS UNIT | BUS UNIT SELECT |
|---|---|
| IOQ | 0000 |
| IOIC/ERBI 1 | 0001 |
| IOIC/ERBI 2 | 0010 |
| IOIC/ERBI 3 | 0011 |
| IOIC/ERBI 4 | 0100 |
| IOIC/ERBI 5 | 0101 |
| IOIC/ERBI 6 | 0110 |
| STIO | 0111 |
| ADCE BUS 1 | 1000 |
| ADCE BUS 2 | 1001 |
| ADCE BUS 3 | 1010 |

| BUS UNIT | CHANNEL ID |
|---|---|
| CHANNEL 1 PROCESS 1 | 0000 |
| CHANNEL 1 PROCESS 2 | 0001 |
| CHANNEL 1 PROCESS 3 | 0010 |
| NOT USED | 0011 |
| CHANNEL 2 PROCESS 1 | 0100 |
| CHANNEL 2 PROCESS 2 | 0101 |
| CHANNEL 2 PROCESS 3 | 0110 |
| NOT USED | 0111 |
| CHANNEL 3 PROCESS 1 | 1000 |
| CHANNEL 3 PROCESS 2 | 1001 |
| CHANNEL 3 PROCESS 3 | 1010 |
| NOT USED | 1011 |
| CHANNEL 4 PROCESS 1 | 1100 |
| CHANNEL 4 PROCESS 2 | 1101 |
| CHANNEL 4 PROCESS 3 | 1110 |
| NOT USED | 1111 |

BUS UNIT ADDRESSING

Load PBO Operation

FIG.7

| 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|----|----|----|----|----|----|----|----|----|----|----|----|----|----|----|----|----|----|----|----|----|----|----|----|----|----|----|----|----|----|----|----|
| PBO COMMAND | | | | | | | | MPV | | | CMD | | | | | CHANNEL ID | | | | BUSEL DEST. | | | | PR | | | DEST | | | | |

PBO Command Fields

COPY PBO Operation

8 Byte Write to Storage Operation

FIG.10

| 0 0 0 0 0 0 0 0 | 0 0 1 1 | 1 1 1 1 1 1 | 1 1 1 1 | 2 2 2 2 | 2 2 2 2 2 2 | 3 3 |
|---|---|---|---|---|---|---|
| 0 1 2 3 4 5 6 7 | 8 9 0 1 | 2 3 4 5 6 7 | 8 9 0 1 | 2 3 4 5 | 6 7 8 9 0 1 | |
| STORAGE COMMAND | KEY | CHANNEL ID | BUSEL SOURCE | BUSEL DEST. | LENGTH | ALC |

Storage, Test and Set Command Fields

8 Byte Read From Storage Operation

Test and Set 8 Byte Read Storage Operation

FIG.13

| 0 0 | 0 1 | 0 2 | 0 3 | 0 4 | 0 5 | 0 6 | 0 7 | 0 8 | 0 9 | 1 0 | 1 1 | 1 2 | 1 3 | 1 4 | 1 5 | 1 6 | 1 7 | 1 8 | 1 9 | 2 0 | 2 1 | 2 2 | 2 3 | 2 4 | 2 5 | 2 6 | 2 7 | 2 8 | 2 9 | 3 0 | 3 1 |
|---|---|---|---|---|---|---|---|---|---|---|---|---|---|---|---|---|---|---|---|---|---|---|---|---|---|---|---|---|---|---|---|
| MESSAGE COMMAND ||||||||| MPV ||| | | | | | | BUSEL SOURCE |||| BUSEL DEST. |||| LENGTH ||||||| |

Message Acceptance Command Fields

16 Byte Message Acceptance Operation

APPARATUS AND METHOD FOR EXTENDING A PARALLEL SYNCHRONOUS DATA AND MESSAGE BUS

TECHNICAL FIELD

The invention relates generally to a bus configuration for a data processing system and particularly to an input/output bus having extended addressing and drive capabilities. Bus protocol is preserved throughout the system and the connected units disconnect and free-up the bus during waiting periods.

The typical data processing system has an assortment of connected devices, both inside the mainframe assembly and separate units connected to the mainframe over cables of various lengths. In such a system it has been common to interconnect units by various types of bus configurations dependent on the nature of the connected devices and the length of the connecting cable. In such systems, the transfer of data between units becomes dependent upon the particular bus connecting the units involved in the transfer. While the desirability for a uniform bus throughout the system has been recognized, the need has gone unsatisfied, due in part to the problems associated with driving the extended length lines, the delays associated with longer length lines, and the problems presented when the execution of a command requires a waiting period which ties up the bus.

CROSS REFERENCES TO RELATED APPLICATIONS

A storage subsystem which may be used in the practice of this invention is described and claimed in the co-pending application Ser. No. 07/212,561, filed June 28, 1988, entitled "Design of a Two Level Cache Including Apparatus for Maintaining Storage Consistency in a Multiprocessor System", which application is incorporated herein by reference and made a part of this application.

Another aspect of a storage subsystem which may be used in the practice of this invention is described and claimed in the co-pending application Ser. No. 07/212,432, filed June 28, 1988, entitled "A Storage Subsystem Including Means for Performing Vector Storage Operations and Data Error Correction Means", which application is incorporated herein by reference and made a part of this application.

An input/output controller for use with systems incorporating this invention is described and claimed in the co-pending application Ser. No. 07/909,431, filed Sept. 19, 1988, entitled "Bus Which Functions as An Input/Output Interface Controller Connecting a Synchronous bus to an Asynchronous Bus and Method for Performing Operations on the Busses", which application is incorporated herein by reference and made a part of this application.

The details of design and operation of the bus identified as the SPD bus are set forth in co-pending application Ser. No. 07/212,292, filed June 27, 1988, entitled "Method and Apparatus for Increasing System Throughput Via an Input/Output Bus of a Computer System During DMA Read/Write Operations Between a Common Memory and an Input/Output Device", which application is incorporated herein by reference and made a part of this application.

BACKGROUND ART

U.S. Pat. No. 3,737,861 shows a data processing system having an I/O bus which is connected between a traffic controller and a device control area unit containing a unique device for the attachment of each external device connected with its own unique attachment bus.

U.S. Pat. No. 4,023,142 shows a data processing system having a reliability and serviceability bus connected to the various units of a data processing system. The bus is designed to accommodate only the testing of the units and does not provide the interface necessary for data processing purposes.

U.S. Pat. No. 4,085,448 shows a data communications bus structure particularly adapted for communication between modules in a data processing system. The described bus structure contemplates the connection to an Input/Output controller with the central processing unit and does not lend itself to the direct connection of Input/Output devices beyond the confines of the central processing unit.

U.S. Pat. No. 4,246,637 shows an input/output controller which incorporates a microprocessor to specify various initial parameters concerning a data transfer, which then proceeds under the control of dedicated hardware, freeing the microprocessor for other tasks. The interface between the input/output controller and the central processing unit is a channel.

U.S. Pat. No. 4,620,278 shows an arbitration unit for a conventional data communications bus. There is no suggestion that a connected unit allow an arbitration to begin at a point in time prior to the data signal as in this invention.

U.S. Pat. No. 4,682,304 shows an I/O interface controller which contains a microprocessor controlled buffer. As is evident from the system diagram of this patent, there is no attempt to provide a uniform bus interface to the various units. The system does not contain an arbitration system for allocation of bus time, instead, the various lines are serviced on a cyclical interrupt basis.

U.S. Pat. No. 4,706,190 shows a data communications bus system in which a remote unit conditionally responds with a signal indicating delay will occur and the controlling unit terminates the transaction. The signal indicating delay does not occur in every instance and does not occur prior to the transmission of data as in the instant invention.

While the disconnection does eventually occur, there is no overlap of the arbitration sequence with the transmission of data on the bus.

U.S. Pat. No. 4,719,569 shows an arbitrator for implementation of a specific arbitration algorithm. It is clear from the description that the arbitration unit does not begin the arbitration until after the data transfer is complete, in contrast to the instant invention in which arbitration begins prior to the completion of data transfer, thereby allowing both arbitration and data transfer to proceed simultaneously.

An article "Input/Output Control Unit Busy Disconnect Mechanism", by M. J. Mitchell, Jr., IBM Technical Disclosure Bulletin, Vol. 19, No. 8, Jan. 1977, pp. 2999-3002, shows a data processing system input/output mechanism which eliminates the software overhead associated with handling the "Control Unit Busy" signal from an I/O controller. There is no showing of a system in which the remote unit provides a signal to allow arbitration to begin prior to the data transfer.

An article "Full Use of Transfer Cycles in Computers", by A. Blum, IBM Technical Disclosure Bulletin, Vol. 24, No. 10, Mar. 1982, pp. 5188-5190, shows an arbitration system in which the arbitration of the next grant begins with the data transfer of the preceding operation, requiring an additional signal which indicates the length of the current transfer. Further, this system requires the unit requesting service to continuously present a signal on a dedicated line to the controller.

An article "Bus Architecture for Passive Fault-Tolerant Command/Response System", IBM Technical Disclosure Bulletin, Vol. 29, No. 3, Aug. 1986, pp. 1313-1317 shows a dual ring bus arrangement which incorporates a fault tolerant design which reconfigures the system in the event of the failure of one unit. The system of this article does not resemble that of the subject invention.

An article "Interface Protocol for Attachment of Bus Units Having Limited I/O Pins to Processors Utilizing Several Buses", IBM Technical Disclosure Bulletin, Vol. 29, No. 10, Mar. 1987, pp. 4664-4671, shows an arrangement for interconnecting bus units within a data processing system. Unlike the system of this invention, the described system does not carry the full bus interface to all connected units.

An article "SPD Bus Throughput Accelerator", IBM Technical Disclosure Bulletin, Vol. 30, No. 4, Sept. 1987, pp. 1828-1829, shows a microprocessor test tool that can be attached to the IBM SPD bus. The system is not designed for the transfer of data, as received data is not retained, but is intended only to "stress" the bus for the purpose of testing.

DISCLOSURE OF THE INVENTION

It is therefore an object of this invention to provide an improved bus for the interconnection of units in a data processing system.

It is another object of the invention to provide a data communication bus for use in interconnecting both internal and Input/Output units in a data processing system.

Still another object of the invention is to provide a uniform bus which extends to all units in a data processing system and allows the units to communicate with each other using a single bus protocol.

A still further object of the invention is to provide a data processing system communication bus which accommodates the connection of units physically packaged with the central processing unit as well as units which are physically remote from the central processing unit, such as an Input/Out device.

These and other objects, features and advantages are realized by a data processing system having a central processing unit including a data communication bus in which incorporates a storage input/output unit, an input/output queue, an address communication bus, an extension of the address communication bus, a plurality of channel units and an input/output controller, in which the address field of a processor bus operation command issued by the central processing unit includes a bus unit selection field which specifies one of the storage input/output units or input/output controllers and a channel identifier field which specifies one of the channel units, such that the processor may disconnect from the bus during wait periods and additional units may be attached to the bus without requiring a change in protocol.

BRIEF DESCRIPTION OF THE DRAWINGS

FIG. 4 is a list of the bus commands and their bit structure.

FIG. 5 is a list of the bus unit select format and the channel Identification format.

FIG. 7 is the format of the PBO Command fields.

FIG. 10 is the format of the Storage, Test and Set Command fields.

FIG. 13 is the format of the Message Acceptance Command fields.

DESCRIPTION OF THE INVENTION

Figure 1:
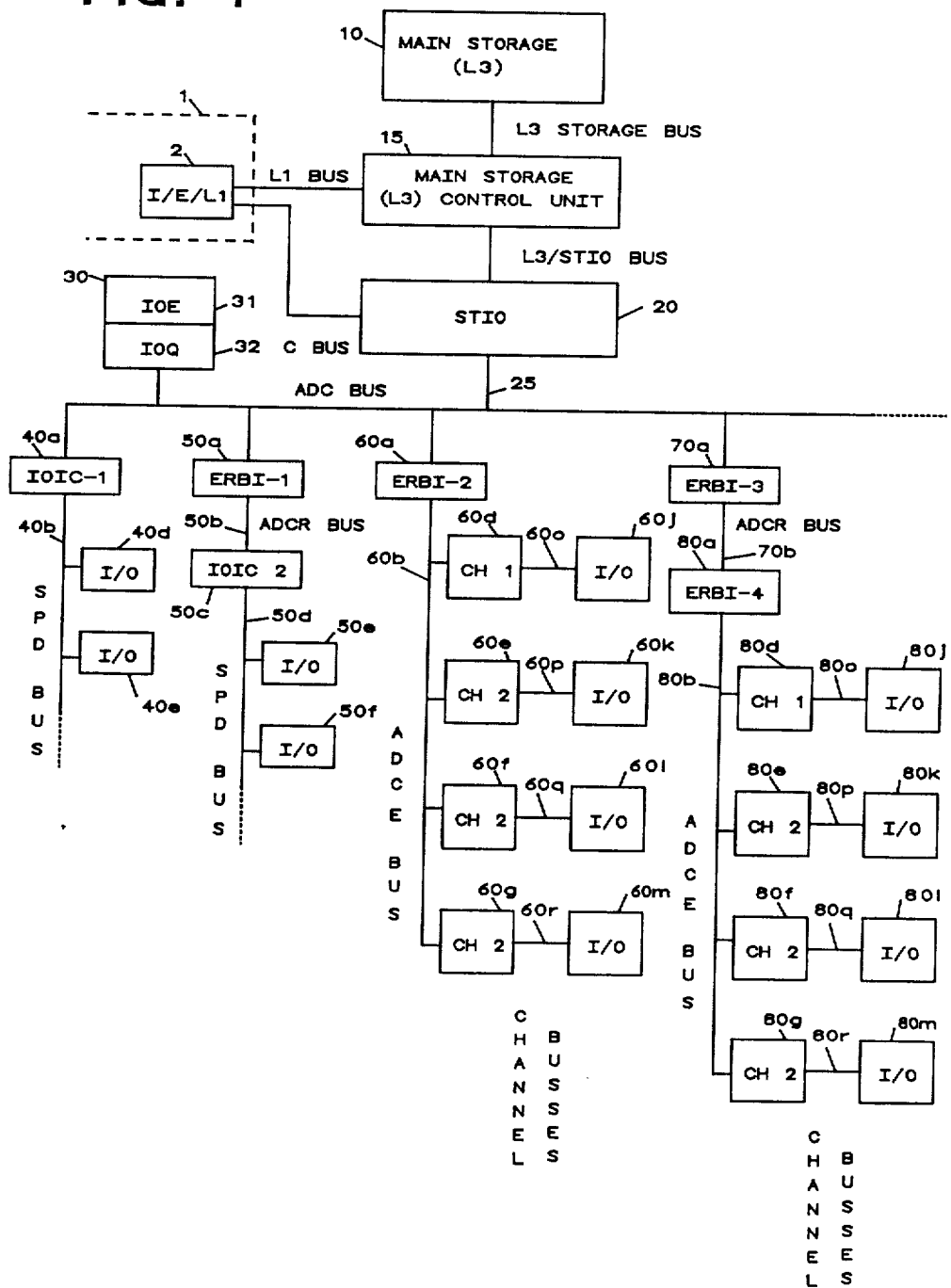
FIG. 1 is a schematic system diagram of a portion of a data processing system which incorporates the invention.

FIG. 1 shows a system diagram of a data processing system incorporating the communication data bus of this invention. A central processing unit 1 comprises an instruction processing unit 2 which is connected to a main storage unit 10 through main storage control unit 15 and to a storage input/output control unit (STIO) 20. Instruction processing unit 2 includes an instruction unit, an execution unit, and an L1 cache unit. In the preferred embodiment, the instruction processor handles all IBM System 370 instructions. The main storage (L3) control unit 15 provides a path to main storage 10 for the storage operations of instruction processor 2 and for input/output operations involving main storage. The storage to input/output unit 20 provides a path to main storage 10 for I/O operations. The address/data/communications bus (ADC) 25 connects STIO 20 to input/output processor 30 which includes an input/output engine (IOE) 31 and an input/output queue unit (IOQ) 32.

In the preferred embodiment the input/output processor handles all IBM system 370 input/output instructions.

The ADC bus 25 also serves to connect STIO unit 20 and IOQ 32 to the input/output interface controller (IOIC-1) 40a, and extended remote bus interface unit (ERBI-1) 50a, extended remote bus interface unit (ERBI-2) 60a, and extended remote bus interface unit (ERBI-3) 70c. IOIC-1 40a provides control of the SPD bus (SPD) 40b. The ERBI-1 unit 50a and ERBI-3 unit 70a provide the bus extension function of the ADC bus 25 in the form of ADCR busses 50b and 70b. ERBI-4 unit 80a provides the bus extension function of ADCR bus 70b in the form of ADCE bus 80b. ERBI-2 unit 60a provides the bus extension function of the ADC bus 25 in the form of ADCE bus 60b.

IOIC-2 50c provides control of the SPD bus 50d. IOIC-1 40a is connected to the subunit processors 40d and 40e over the SPD bus 40b. Similarly, IOIC-2 50c is connected to the subunit processors 50e and 50f over the SPD bus 50d. The channel processor units 60d, 60e, 60f and 60g are connected in common to ERBI-2 over the ADCE bus 60b and individually to the I/O subunit processors 60j, 60k, 60l and 60m, respectively, over the channel busses 60o, 60p, 60q and 60r, respectively In like fashion, ADCE bus 80b leading from ERBI-4 80a connects to channel processing units 80d, 80e, 80f and 80g. The I/O subunit processors 80j, 80k, 80l and 80m are individually connected to the channel processing units 80d, 80e, 80f and 80g, respectively, over the channel busses 80o, 80p, 80q and 80r, respectively.

The instruction processing unit 2 executes IBM System 370 instructions which are taken from an L1 cache unit. The results of the instruction execution are stored in the L3 main storage unit 10. If it is necessary to transfer the results to one of the various I/O subunits 40d, 40e, 50e, 50f, 60j, 60k, 60l, 60m, 80j, 80k, 80l or 80m, the I/O processor unit 30 sends commands to the selected one of I/O subunits 40d, for example, which then initiate a main storage 10 operation. When the selected one of the I/O subunits 40d is finished with the use of main storage 10, the I/O processor unit 30 sends an ending status to the instruction processor 2 indicating that the operation is complete.

The ADC bus 25 provides a path for the I/O processor unit 30 to communicate with the I/O subsystem and storage 10. It also provides a path for the various of the I/O devices to get to main storage 10. Because of technology constraints, it is common to limit the number of drops on a given bus. In a typical bus the maximum number of drops which can be handled is eight. The number of allowable drops is increased by adding extended remote bus interface units 50a, 60a, 70a and 80a. The ERBI-2 unit 60a and ERBI-4 unit 80a provide the capability to attach a standard IBM System 370 channel bus with the use of the channel processors 60d–60g and 80d–80g.

The ADCR buses have extended driving capability to allow the physical extension of the bus to a remote unit. The ADC bus 25, the ADCE bus 60b and 80b, and the ADCR bus 50b and 70b each use the same remote signals and bus handshake and pass the same information for each operation. This extends the uniformity of the bus interface throughout the I/O subsystem.

A command and the associated data sent from a bus unit on the ADCR bus 50b is stored in ERBI-1 50a, which then passes the command and data on ADC bus 25. Similarly, a command and data from a unit on ADCE bus 60b is stored in ERBI-2 60a and then passed over ADC bus 25. The other ERBI units 50a, 70a and 80a function in similar fashion.

Arbitration of the ADC bus 25 is handled by IOQ unit 32. The logical arrangement of the arbitration is conventional although the timing is different from similar prior art systems.

Figure 2:
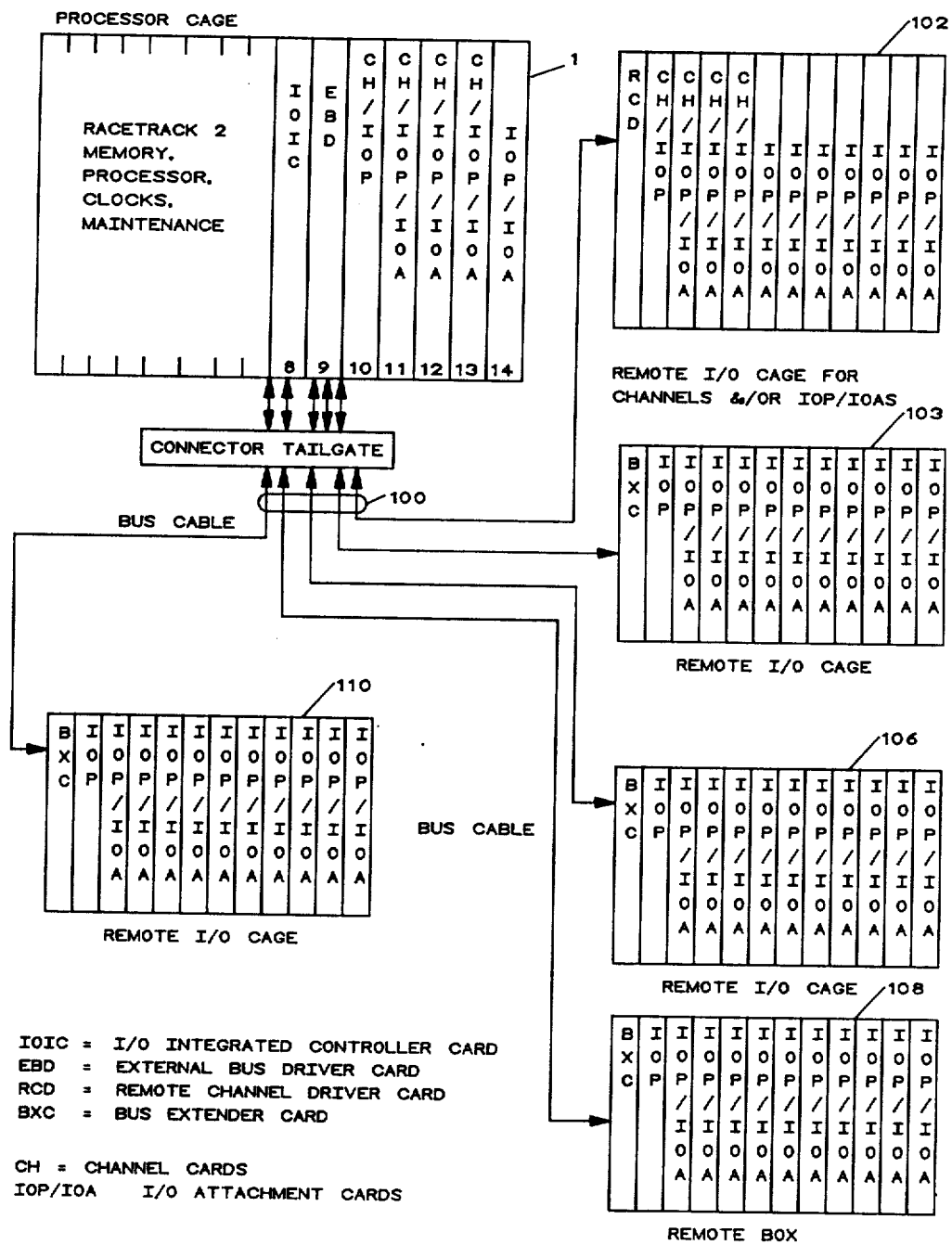
FIG. 2 is a schematic showing of the interconnecting bus cables of the system.
Figure 3:
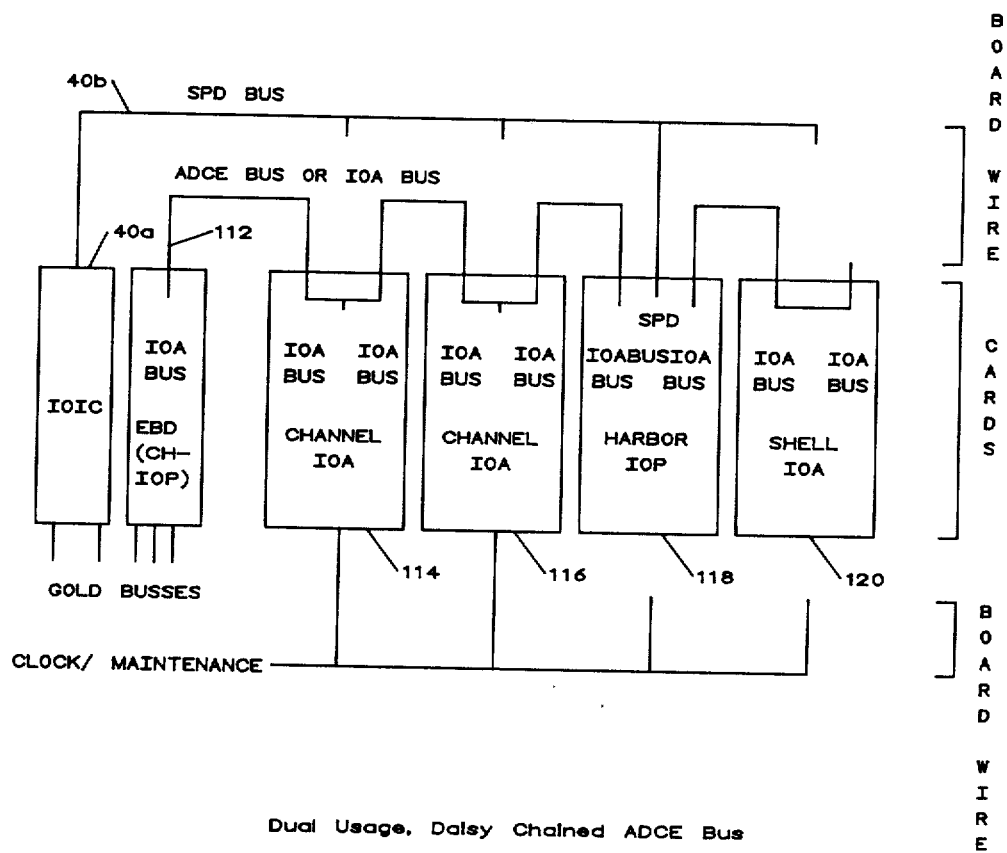
FIG. 3 is a schematic showing of the physical routing of a bus shown in FIG. 1.

Physical routing of the ADCE bus and ADCR bus is shown in FIG. 2. The ADCR bus 100 is a part the cables extending between the processor 1 and the remote units 102, 104, 106, 108 and 110. The ADCE bus is mounted on board wires. FIG. 3 shows how the ADCE bus 112 is daisy chained though channel processor units cards 114 and 116 or IOA's 120. In this arrangement, the logic card wiring can be used for the ADCE bus 112 for an IOA bus. An IOA bus 112 is used to connect I/O subunits to an IOP 118 which is then attached to an SPD bus 406. In the daisy chain arrangement, each channel processor unit card (i.e., 114 and 116) propagates the ADCE bus 112, and an IOP 118 breaks the chain. IOA's 114, 116 and 120 propagate the IOA bus 112. This provides the ability to attach channel processor units, IOP units or IOA units in the same logic card slot.

Clocking of the ADC bus 112 25 and the ADCE bus is conventional. The clocking system for the ADCR busses 50b and 70b is described in copending patent application serial number 07/211,032, entitled "Dual Clocked Data Bus", filed June 24, 1988.

Each unit connected to either the ADC bus 25 or an ADCE bus must develop signals to be received or placed on the bi-directional Address/Data/Command bus and the control bus. The lines of the Address/Data/Command bus and the control bus extend and connect to all bus units. Each unit develops signals for and responds to signals from the arbitration unit. The units develop signals for transmission to the arbitration unit indicating message request and storage request and respond to the grant signal from the arbitration unit.

Figure 16:
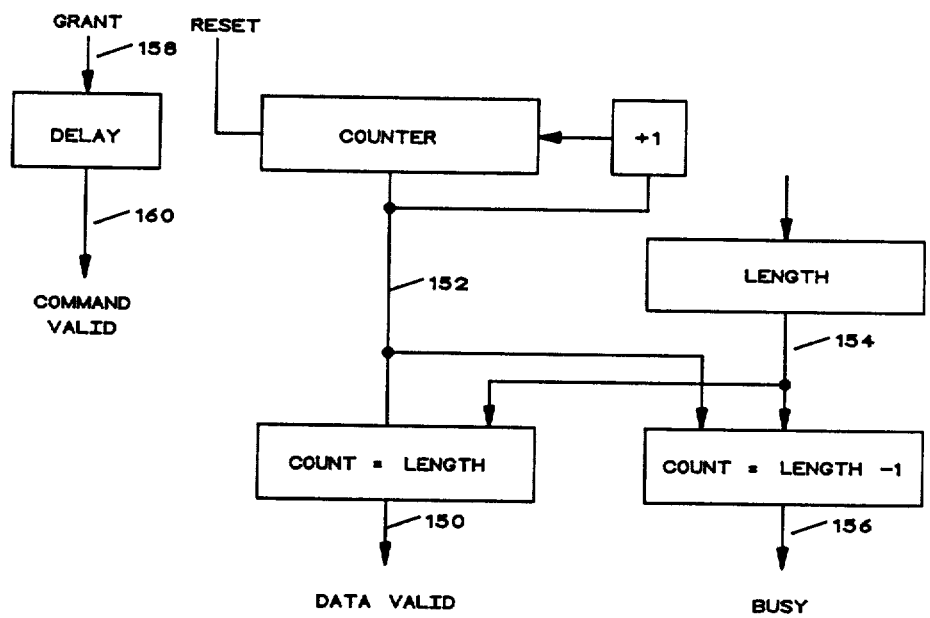
FIG. 16 is a showing of the fashion in which the bus handshake control signals are developed.

FIG. 16 shows the fashion in which the various handshake signals are developed. The DATA VALID signal 150 is developed when the count 152 is equal to the length 154. The BUSY signal 156 is developed when the count 152 is one less than the length 154.

The Address/Data/Command bus is a 36 bit, tri-state, bi-directional bus consisting of 4 bytes with parity. The bus is used to transfer storage data, message information and commands between the various I/O subsystem bus units. The control bus is a 4 bit, tri-state, bi-directional bus consisting of 3 control bits and one parity bit. It is driven by the bus unit which last received a Bus Grant signal 158. Bit 0 is the COMMAND VALID bit 160. This signal indicates a valid command is on the Address/Data/Command bus. All bus units must sample the Address/Data/Command bus during this cycle and determine if the command is for them. Bit 1 is the DATA VALID bit 160. This signal indicates that there is valid data on the Address/Data/Command bus. Bit 2 is the BUS BUSY bit 156. This signal indicates the Address/Data/Command bus is busy and serves to stop arbitration on the Address/Data/Command bus. The bus unit driving this signal drives it inactive one cycle before the last transfer of data on the Address/Data/Command bus. This signal can be developed from the leading edge of the clock pulse immediately preceding the clock pulse which gates data onto the bus. By driving the BUS BUSY signal inactive one cycle prior to the data signal 158, the arbitration unit has sufficient time to determine which of the contending bus units is to be selected for the next transfer. Bit 3 is the parity bit for the bits 0–2.

The Processor Bus Operation (PBO) Status signals are driven by the bus unit that receives the PBO command to indicate status during the PBO operation. The IOQ waits up to 32 cycles after a PBO command is sent out on the ADC bus for either bit to be driven active. A given implementation could utilize any appropriate value but the preferred embodiment utilizes 32 cycles to represent the worst case delay required to send a PBO command to a bus unit attached to the ADCR bus. If neither bit is driven active during this time the bus unit is assumed to be unavailable. An "01" bit combination indicates that the bus unit is busy. A "10" bit combination indicates that the bus unit received the PBO command and data with no errors. An "11" bit combination indicates that an error has occurred during the PBO operation.

MESSAGE REQUESTS are signals generated to obtain access to the bus for Message Acceptance operations and PBO Return Data commands. There is a unique message request signal for each bus unit.

STORAGE REQUESTS are signals generated to obtain access to the bus for L3 main storage operations. As is the case for MESSAGE REQUESTS, there is one unique storage request signal for each bus unit.

GRANTS are signals generated in response to MESSAGE REQUESTS and STORAGE REQUESTS. These signals are used to grant access to the bus. There is a unique signal for each bus unit. The bus unit having the highest priority at the time of request, as determined by the arbitration units and the arbitration algorithm, will receive the grant. The GRANT signal is developed by the arbitration unit.

MESSAGE STATUS signals are driven at the end of a MESSAGE ACCEPTANCE OPERATION to indicate the status of the operation. If the operation is successful, this signal is held active for one cycle. If the operation failed, this signal is held active for two cycles.

The three primary uses for the ADC bus, the ADCE bus and the ADCR buses include: (1) Transfer of Processor Bus Operation (PBO) information. (2) Transfer of data to or from L3 main storage 10. (3) Transfer of message information to the IOQ Message Buffer.

Bus operations consist of arbitration cycles, COMMAND VALID cycles, DATA VALID cycles and STATUS cycles. A bus operation is initiated by activating a request signal. Upon receipt of corresponding grant signal, the requesting bus unit activates the COMMAND VALID control signal and gates 4 bytes of command information onto the Address/Data/Command bus 25. During this cycle, Byte 0 always contains the command. The specific commands are set forth in the showing of FIG. 4. The particular bus unit for which the command sent during COMMAND VALID is determined by the content of the bus unit select destination field and, if necessary, the channel identifier field.

The format and content of the bus unit select field and the channel identifier field are shown in FIG. 5. The bus unit select destination field identifies either the IOQ, STIO, or IOIC connected to ADC bus 25 or an IOIC connected to ADCR bus 50b or 70b, or it identifies and ADCE bus. For channel processor units connected to an ADCE bus 60b or 80b, the bus unit select destination field will be shared by all the units on that bus. In such cases, the channel identifier field is used to identify the particular channel processor unit and process ID for which the command is intended.

Processor Bus Operations always originate from IOQ 32 and consist of two types, COPY operations and LOAD operations. A LOAD operation sends data from IOQ 32 to another bus unit. A COPY operation takes data from a bus unit and returns it to IOQ 32. For each PBO operation, the bus unit which receives the command responds with status information by driving the PBO STATUS signals. The length of time between receiving the PBO command and driving the PBO STATUS signal is variable, allowing PBOs to be sent not only to IOICs connected to ADC bus 25, but also to channel processor units connected to ADCE busses 60b and 80b, as well as IOICs connected to ADCR busses 50b and 70b. The driving of this status signal is overlapped with the next succeeding operation on ADC bus 25.

The COPY PBOs require two bus operations. During the first operation, the IOQ 32 sends the PBO command and then disconnects from the bus, thereby freeing it for other operations. In the timing diagram of FIG. 8, this is illustrated by the command on the Address/Data/Command bus and the subsequent PBO Status "0" signal, which causes disconnection. During the second operation, the bus unit which received the COPY PBO command returns the requested data.

Figure 6:
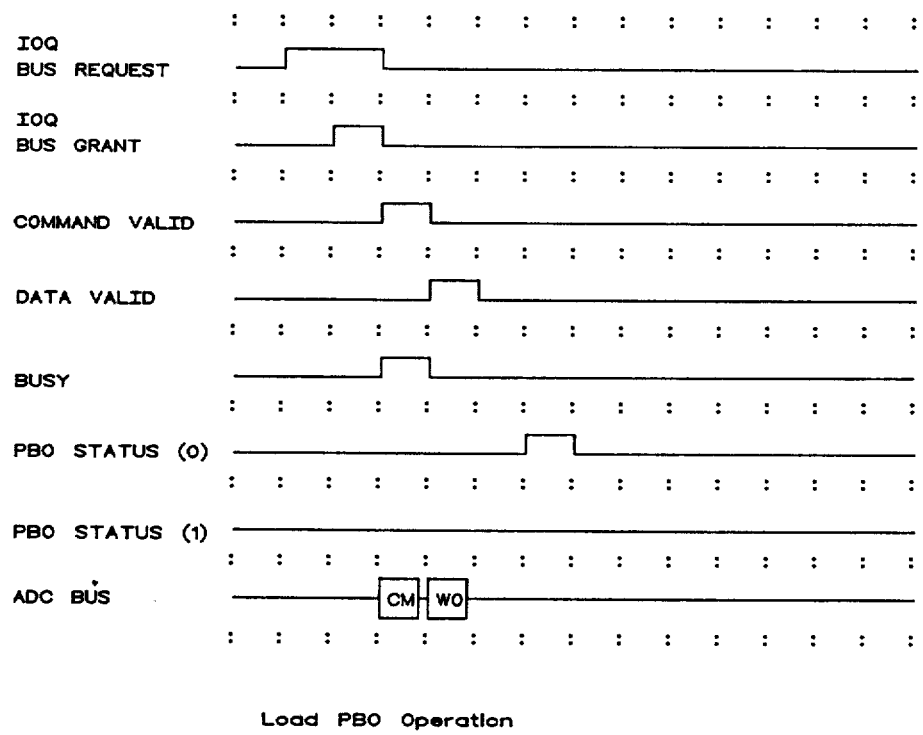
FIG. 6 is a timing diagram of the Load PBO operation.

The system timing for the LOAD PBO operation is shown in FIG. 6. At the time of COMMAND VALID the PBO command is shown in FIG. 7 is on the bus. The PBO command is specified by the content of bits 0–7, making up the first byte. Bits 8–10 specify the message priority value. The message priority value (MPV) sent during the PBO operation indicates whether the command is an asynchronous or synchronous command. If MPV='0XX', the command is synchronous. If MPV='1XX', the command is asynchronous. Bits 11–15 contain the SPD bus command. Bits 16–19 contain the channel ID field. Bits 20–23 contain the bus unit select destination field. Bits 24–25 specify the SPD bus priority and are more fully described in the referenced co-pending application corresponding to. Bits 27–31 contain the SPD bus destination field which identifies the particular unit to which the operation is directed.

At DATA VALID time the Address/Data/Command bus contains the PBO data. At PBO status time, the PBO status line contain the status of the PBO operation.

Figure 8:
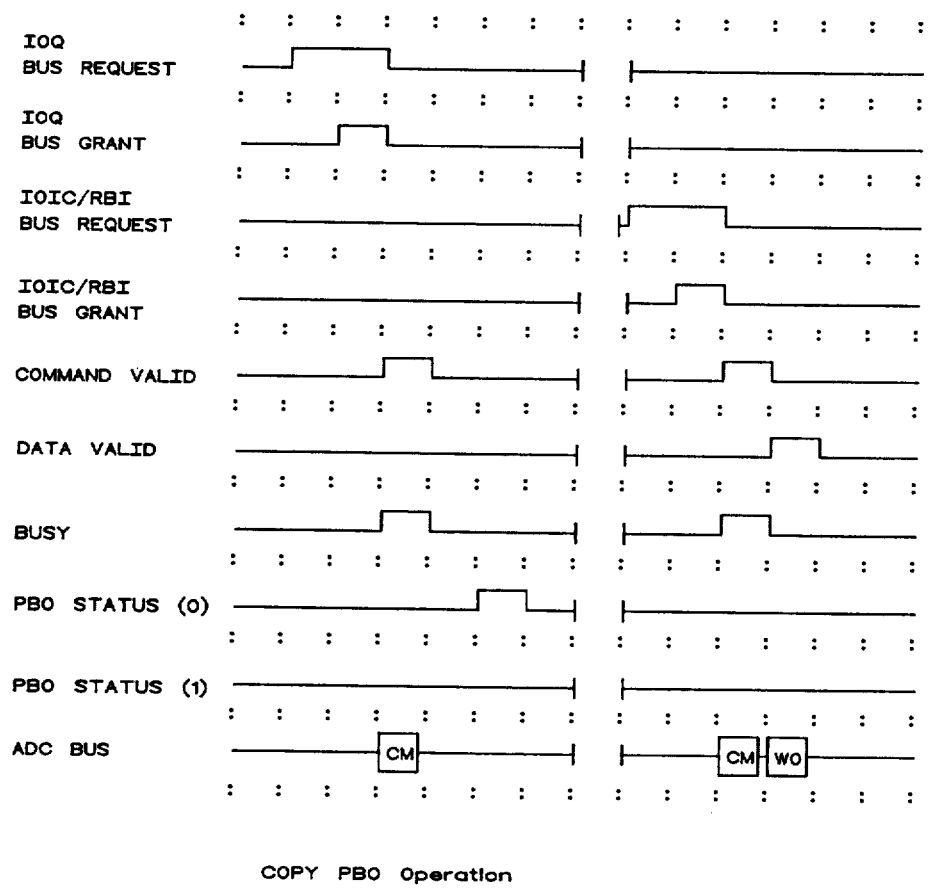
FIG. 8 is a timing diagram of the Copy PBO operation.

The system timing for the COPY PBO operation is shown in FIG. 8. At the COMMAND VALID time the Address/Data/Command bus contains the PBO command and the fields passed are the same as those passed for the LOAD PBO. The IOQ disconnects from the bus after the COMMAND VALID cycle and waits for the return data. The PBO STATUS time specifies the time when the bus line contains the status of the PBO operation. At the time of the COMMAND VALID signal the Address/Data/Command bus contains the return PBO command. The DATA VALID signal indicates that the Address/Data/Command bus contains the requested PBO data.

Storage Operations originate from one of the IOICs or one of the channel processor units or from the IOQ. There are three types of storage operations: Read, Write or Test and Set. Read takes data from the L3 main storage unit 10 and returns it to the unit that requested it. Write takes data from the unit on the bus and places it in L3 main storage 10. Test and Set operations conditionally write one byte to L3 main storage 10 and then return the L3 main storage data to the requesting unit on the ADC bus 25. These operations are initiated by sending a command to the STIO 20. If the command is a Write, data follows immediately after the command. For each operation the requesting bus unit disconnects from the bus after the transfer and waits for status information. This frees the bus for other operations while the L3 main storage 10 operation takes place. When the storage operation is complete the STIO 20 returns status for that operation. If the operation is a read, the STIO 20 returns data immediately after the status.

Figure 9:
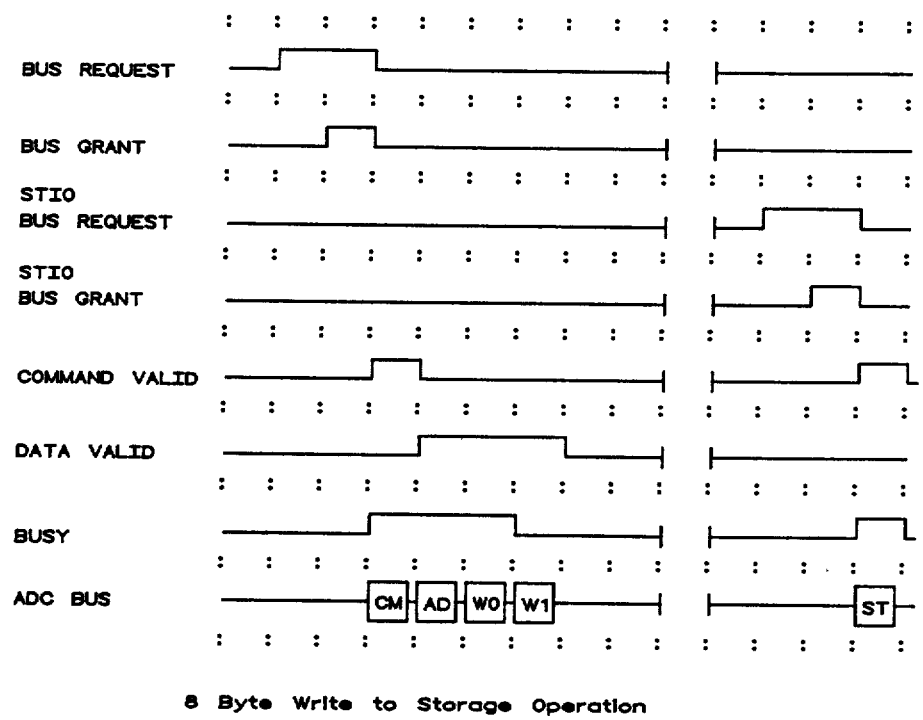
FIG. 9 is a timing diagram of an 8 byte Write to Storage operation.

The timing diagram for the Write operation is set forth in FIG. 9, and the structure of the command is shown in FIG. 10. During the period defined by the COMMAND VALID signal, byte 0 contains the storage command, and bits 8-11 contain the STORAGE KEY, which performs the usual IBM System/370 functions, more fully described in the IBM System 370 Principles of Operation manual. Bits 12-15 contain the channel ID. Bits 16-19 contain the bus unit select of the source bus unit. Bits 24-29 contain the length of the storage operation to designate the number of bytes to be transferred, less one. Bits 30-31 contain the address limit check field. The address limit check field (ALC) is specified by microcode. A '00' bit combination indicates no Address Limit Checking.

A '01' bit combination indicates Data Address >= Limit Check. A '10' bit combination indicates Data Address < Limit Check. A '11' bit combination is simply undefined and not used in this embodiment.

At the occurrence of the first DATA VALID cycle, the Address/Data/Command bus contains the data to be transferred to storage. After the termination of this cycle, the bus unit disconnects from the bus and waits for a status signal.

As shown in the last line of the timing diagram of FIG. 9, the Address/Data/Command bus contains the status command in byte 0 and the status field in byte 1. The status field is defined as follows:

Bit 0—ACB Check
Bit 1—Key Check
Bit 2—Address Limit Check
Bit 3—Storage Hardware Error at NIO Clock Rate
Bit 4—Uncorrectable Error
Bit 5—Storage Hardware Error at LEP Clock Rate
Bit 6—Physical Memory Boundary Exceeded
Bit 7—Key Array Hardware Error This field is used by the microcode to determine the severity of the storage error.

Figure 11:
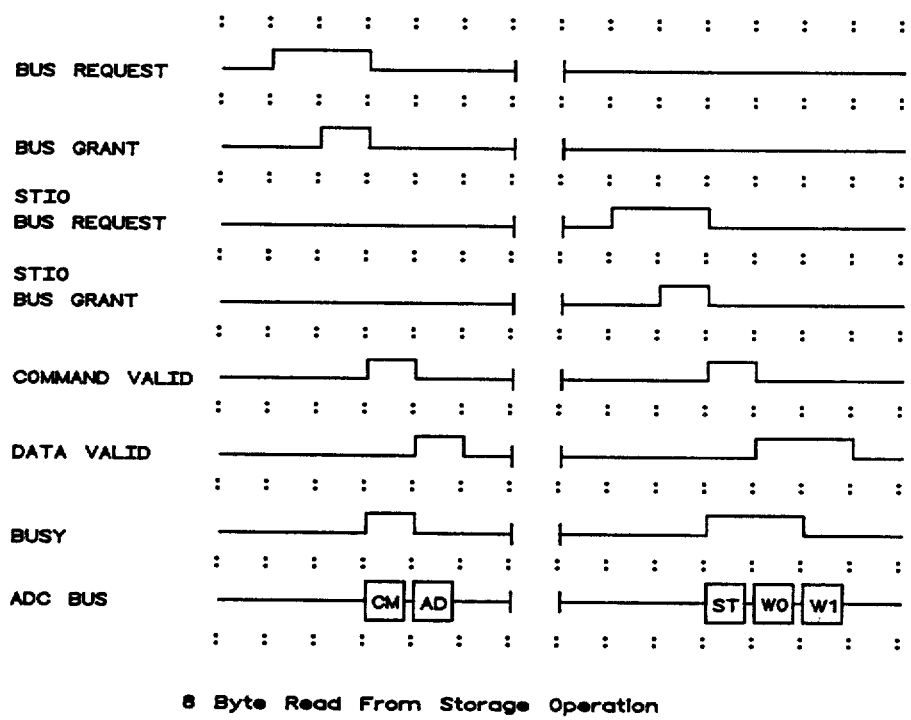
FIG. 11 is a timing diagram of an 8 byte Read From Storage operation.

With reference to FIG. 11 which shows the timing diagram for the command structure for the read from storage operation, the COMMAND VALID information is the same as that for the previously described Write operation. The first DATA VALID cycle presents the 31 bit storage address on the Address/Data/Command bus. In a fashion similar to that previously described, after the address information is presented, the bus disconnects and waits for status and data. At the occurrence of the second DATA VALID cycle the Address/Data/Command bus contains the returned storage data.

Figure 12:
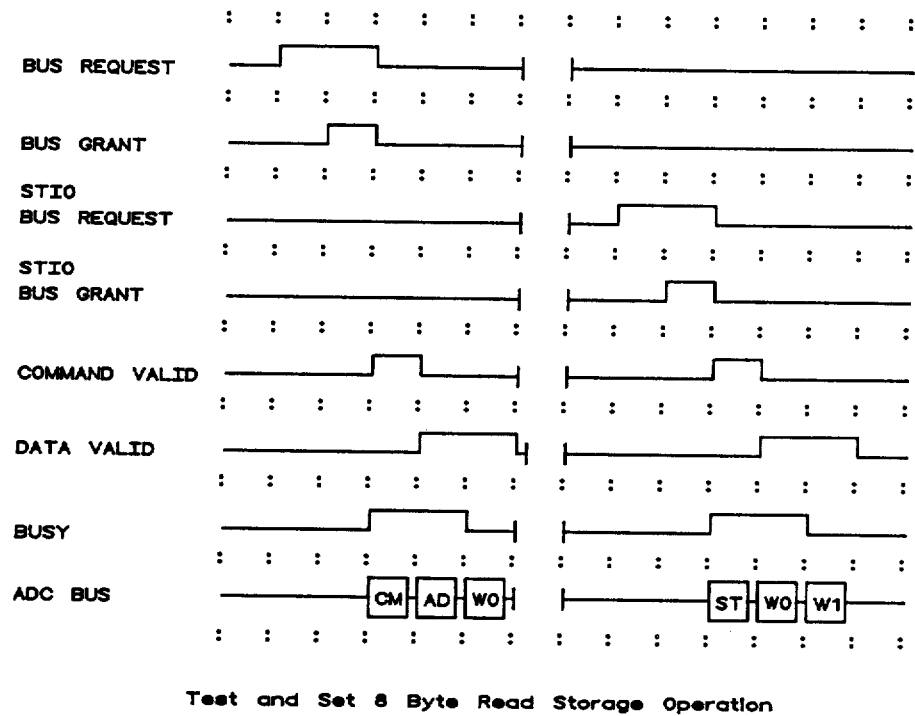
FIG. 12 is a timing diagram for a Test and Set 8 Byte Read Storage operation.

The timing for Test and Set Storage is shown in FIG. 12. The Address/Data/Command bus contains the same command information as the previously described Write operation. During the first DATA VALID cycle, the Address/Data/Command bus contains the 31 bit storage address. During the second DATA VALID cycle, the Address/Data/Command bus contains the data for the conditional write to storage unit 10. As previously described, the unit disconnects from the bus at the end of the first DATA VALID cycle and waits for status and data.

The Address/Data/Command bus contains the status command in byte 0 and the status field in byte 1 during the STATUS COMMAND VALID cycle. During the second DATA VALID cycle, the Address/Data/Command bus contains the returned storage date.

Figure 14:
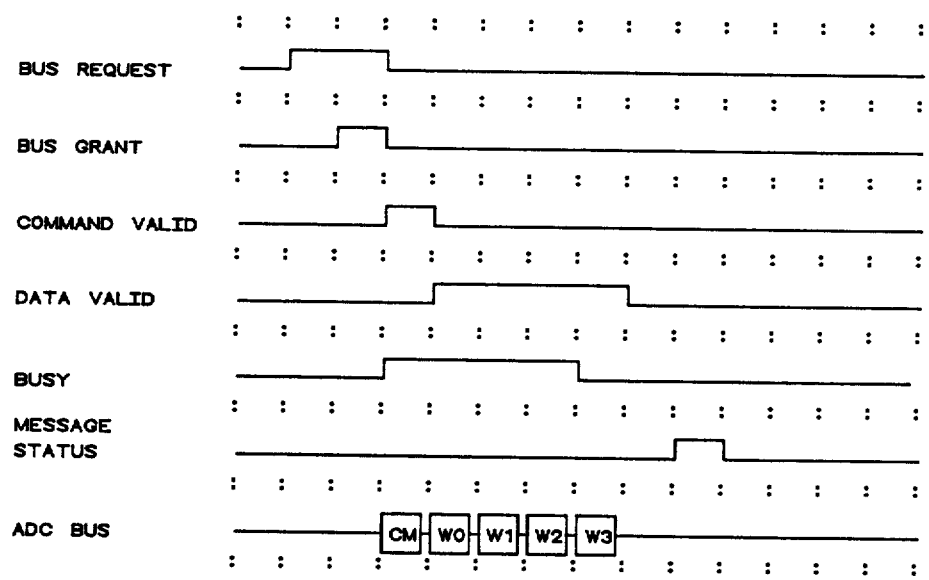
FIG. 14 is a timing diagram of a 16 Byte Message Acceptance operation.

Message operations are described with reference to FIG. 13, which shows the command structure, and with reference to FIG. 14, which shows the timing diagram for the operations. Message operations originate from one of the IOICs or one of the channel processing units. These operations take data from the bus unit and put it in a message buffer in the IOQ 32. When the message operation is complete, the IOQ 32 returns status for that operation by driving the MESSAGE STATUS signal. If the operation is successful, the IOQ 32 holds the signal active for one cycle. If the operation failed, the IOQ 32 holds the signal active for two cycles.

The Address/Data/Command bus contains the message command information. With reference to FIG. 13, byte 0 contains the message command. Bits 8-10 contain the message priority value. The message priority value (MPV) sent during the message operation determines into which message buffer in the IOQ a unit message goes. If MPV='0XX' messages go into message buffer zero. If MPV='1XX' messages go into message buffer one. Bits 16-19 contain the bus unit select of the source bus unit. Bits 20-23 contain the bus unit select of the destination bus unit. Bits 24-29 define the length of the message operation, designated one less than the number of bytes that are to be transferred. As shown by the DATA VALID signal, the Address/Data/Command bus contains the message data for four cycles. The MESSAGE STATUS signal indicates the status of the operation as previously described.

Figure 15:
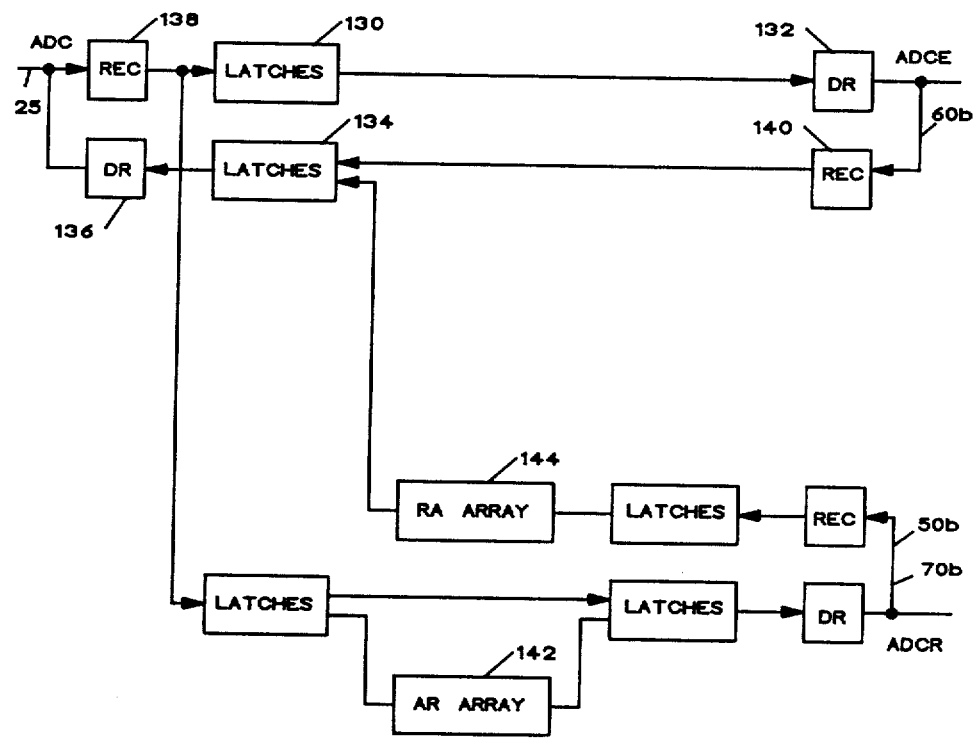
FIG. 15 is a schematic logic diagram of the ERBI unit.

FIG. 15 shows the logic arrangement for the ERBI units 50a, 60a, 70a and 80a. The ERBI units provide the I/O Bus extension for the processors I/O subsystem. The units provide two logical paths. The first path lies between the ADC bus 25 and the ADCE bus 60b. This path has but one set of latches 130 and 134 and controls 132 and 136 in each direction and therefore generates minimum delay. As shown in FIG. 1 the ADCE bus 60b is used to drive channels which are resident in the same logic card cage as that in which the ERBI unit resides. In the preferred embodiment, the functions of the ERBI unit are packaged in a single semiconductor chip.

The other logical path lies between the ADC bus 25 and the ADCR bus 50b or 70b, shown in FIG. 1. This path includes an ADC bus to ADCR bus array (AR ARRAY 142), a ADCR bus to ADC bus array (RA ARRAY 144) and the other controls required for the extension. The AR ARRAY 142 is used to store the information from the ADC bus if it arrives when the ADCR bus is busy. If the ADCR bus is not busy when the first word of ADC bus information arrives, the AR ARRAY 142 is simply bypassed, and the signal flows directly between the latches as shown. The ADCR bus to ADC bus array, RA ARRAY 144, is used to store the information taken from the ADCR bus. The information on the ADCR bus arrives and is latched with clocks that are not synchronous with the ERBI unit clocks. Therefore, when the first word of information is written into the RA ARRAY 144, a start signal goes through the metastability logic to request access to the ADC bus 25. When the grant to send information on the ADC bus 25 is received, the information is read out of the AR ARRAY 142, It will be appreciated that the RA ARRAY 144 sharply reduces the amount of time required for the ERBI unit to be connected to the ADC bus 25 in order to pass information from the ACCR bus to the ADC bus 25.

The ERBI unit permits use of the same bus protocol at the ADC-ERBI interface which is a multidrop connection, the ADCE-ERBI interface which is daisy chained and the ADCR-ERBI interface which is normally a high speed cable.

We claim:

1. In a data communication bus system for transferring information between a central processing unit, a storage unit and input/output units, including an arbitration unit for selecting one of a plurality of units contending for access to said bus system, comprising:
   a. a plurality of data lines;
   b. a plurality of control lines;
   c. a first of said control lines adapted to carry a busy signal;
   d. control signal means associated with said units for placing signals on said control lines to control operation of said units including a busy signal which is generated upon transfer of a block of information;
   e. said control signal means including means for terminating said busy signal on a first one of said plurality of control lines prior to the termination of data signals on said data lines; and,
   f. means within said arbitration unit for inhibiting the selection of one of a plurality of contending units when said busy signal is present and permitting the selection of one of a plurality of contending units when said busy signal is absent whereby the arbitration sequence is performed during the completion of said transfer of said block of information.

2. A data processing system comprising a central processing unit, a storage unit and input/output units, said data processing system including a storage input/output unit (STIO), an input/output queue (IOQ), an Address/Data/Communication Bus (ADC) coupling said central processing unit to said storage input/output unit and said input/output queue, an Address/Data/Communication Extended Bus (ADCE), a remote extension of said ADC bus including an Address/Data/Communication Remote Bus (ADCR) coupling an Input/Output Integrated Controller unit (IOIC) to a plurality of channel processing units, said data processing system having an addressing system having an address field portion of a processor bus operation command, first means within said address field including a first, bus unit selection field for specifying one of said STIO, IOQ or IOIC unit, and second means within said address field further including a second, channel identifier field for specifying one of said plurality of channel processing units.

3. In a data processing system, a communication bus for transferring information between a central processing unit, a storage unit and input/output units, an arbitration unit responding to the absence of a BUS BUSY signal to select a one of a plurality of units when said plurality of units is contending for access to said bus, the improvement comprising:
   a. DATA VALID control signal developing means in each of said units connected to said bus indicating the presence of valid data on said bus; and,
   b. Bus Busy signal developing means in each of said units connected to said bus for developing a BUS BUSY signal which terminates prior to termination of said DATA VALID signals developed by the unit, causing said arbitration unit to make an arbitration decision immediately prior to the termination of valid data on said bus.

4. A data communication bus system according to claim 1 wherein said central processing unit and said storage unit are mounted within a mainframe and at least one of said input/output units is mounted external to said mainframe, whereby said plurality of data lines and said plurality of control lines extend from said mainframe to said at least one of said input/output units mounted external to said mainframe.

5. A data communication bus system according to claim 4 further comprising parity checking means coupled to said plurality of data lines.

6. A data communication bus system according to claim 4 further comprising parity checking means coupled to said plurality of data lines.

7. A data communication bus system according to claim 5 further comprising parity checking means coupled to said plurality of control lines.

8. A data processing system according to claim 2 wherein said input/output queue further comprises means coupled to said bus for determining whether a one of said units which is addressed by said bus responds within a period of time whereby failure to respond within said period of time indicates an error condition.

9. A method of providing communication between selected pairs of a plurality of units within a data processing system wherein a first group of said plurality of units is located within a mainframe having a host processor and a storage unit and a second group of said plurality of units is located external to said mainframe comprising:
   a. constructing a bus for communication between said selected pairs of said plurality of units;
   b. coupling said bus to each of said plurality of units;
   c. defining a protocol which permits each of said plurality of units to be addressed by at least one other of said plurality of units; and,
   d. arbitrating requests from said plurality of units by means of said data processing system such that only one of said plurality of units at a time is permitted to transfer data over said bus.

10. A method according to claim 9 wherein said coupling step further comprises:
    a. wiring said bus to each of said first group by internal card wiring; and,
    b. wiring said bus to each of said second group by input/output cabling.

11. A method according to claim 10 further comprising transferring control messages on said bus from said host processor to at least one of said second group of said plurality of units.

12. A method according to claim 10 further comprising transferring control messages on said bus from at least one of said second group of said plurality of units to said host processor.

13. A method according to claim 10 further comprising transferring data on said bus between at least one of said second groups of said plurality of units.

* * * * *